United States Patent [19]

Suzuki

[11] Patent Number: 4,875,752
[45] Date of Patent: Oct. 24, 1989

[54] OPTICAL SEMICONDUCTOR MODULE USING DUMMY FERRULE

[75] Inventor: Akinobu Suzuki, Kamakura, Japan

[73] Assignee: Mitsubishi Denki Kabushiki Kaisha, Tokyo, Japan

[21] Appl. No.: 155,517

[22] Filed: Feb. 12, 1988

[30] Foreign Application Priority Data

Feb. 13, 1987 [JP] Japan .................................. 62-19527
Mar. 5, 1987 [JP] Japan .................................. 62-32127

[51] Int. Cl.$^4$ ............................................. G02B 6/36
[52] U.S. Cl. ................................................... 350/96.2
[58] Field of Search .................. 350/96.2, 96.18, 96.21

[56] References Cited

U.S. PATENT DOCUMENTS 4,281,891 8/1981 Shinohara et al. ............... 350/96.18

FOREIGN PATENT DOCUMENTS 0014610 8/1980 European Pat. Off. ........... 350/96.2
59-70355 5/1984 Japan .
59-170812 11/1984 Japan .
60-59204 4/1985 Japan .

Primary Examiner—John D. Lee
Assistant Examiner—John Ngo
Attorney, Agent, or Firm—Oblon, Spivak, McClelland, Maier & Neustadt

[57] ABSTRACT

An optical semiconductor module comprises an optical semiconductor assembly having a light transmitting aperture, a housing having a joint surface at its one end to be joined to the optical semiconductor assembly, an outer male screw portion and a first hole for receiving an optical fiber supporter at its other end, a lens held in a second hole formed in the housing so as to be in communicatively alignment with the light transmitting aperture and the first hole, wherein a slitted sleeve is placed in a hole communicated with the first hole and a dummy ferrule with an axially extendly central bore for passing light is placed between the first hole and the lens so that one end portion of the dummy ferrule is inserted in the slitted sleeve so as to be in contact with the optical fiber supporter when it is fitted.

5 Claims, 3 Drawing Sheets

OPTICAL SEMICONDUCTOR MODULE USING DUMMY FERRULE

The present invention relates to an optical semiconductor module used mainly for a trunk line for optical communication.

FIG. 4 is a cross-sectional view showing a typical example of conventional optical semiconductor modules.

In FIG. 4, a reference numeral 1 designates a housing. An outer male screw 2 is formed at one end portion of the housing 1 to be engaged with a female screw formed in an FC type connector. A first hole 3 is formed at the same end portion of the housing to receive therein an optical fiber supporter (hereinbelow, referred to as a ferrule) attached to the FC type connector.

A numeral 4 designates a wall to determine the position of the ferrule which is pushed by a spring provided in the FC type connector, a numeral 5 designates a light transmitting hole formed in the housing to be communicated with the first hole 3, a numeral 6 designates a lens which is received in a second hole 7 formed in the housing 1 to be communicated with the light transmitting hole 5. The lens 6 is fixed in the second hole 7 by means of a screw 8. An optical semiconductor assembly 9 is attached to a joint surface 16 of the housing which is opposite the one end in which the outer male screw 2 and the first hole 3 are formed. The optical semiconductor assembly 9 comprises a stem 10, an optical semiconductor element 11 fitted onto the stem 10, a pair of lead terminals 12 connected to the stem 10 at the opposite side of the optical semiconductor element 11, a protective cap 13 fixed to the stem 10 so as to cover the optical semiconductor element 11 and a light transmitting plate 15 attached to the protective cap 13 so as to cover a light transmitting aperture 14 formed in the protective cap 13.

In the conventional optical semiconductor module having the construction as above-mentioned, connection of the FC type connector to the housing 1 is performed by inserting the ferrule into the first hole 3 and engaging the female screw formed in the FC type connector with the male screw 2; thus, an optical fiber in the ferrule is optically connected to the optical semiconductor element 11.

However, in the conventional optical semiconductor module, there may produce an air gap between the first hole 3 and the ferrule when the latter is inserted in the former, and the ferrule is movable in the air gap, whereby a stable optical connection could not be obtained.

The present invention is to eliminate the above-mentioned problem and to provide an optical semiconductor module capable of providing a stable optical connection.

The foregoing and the other objects of the present invention have been attained by providing an optical semiconductor module comprising an optical semiconductor assembly having a light transmitting aperture, a housing having a joint surface at its one end to be joined to the optical semiconductor assembly, an outer male screw portion and a first hole means for receiving an optical fiber supporter at its other end, a lens held in a second hole means formed in the housing so as to be in communicatively alignment with the light transmitting aperture and the first hole means, characterized by comprising a slitted sleeve placed in a hole communicated with the first hole means and a dummy ferrule with an axially extending central bore for passing light which is placed between the first hole means and the lens so that one end portion of the dummy ferrule is inserted in the slitted sleeve so as to be in contact with the optical fiber supporter when it is fitted.

In the following, preferred embodiments of the present invention will be described with reference to the drawings.

Figure 1:
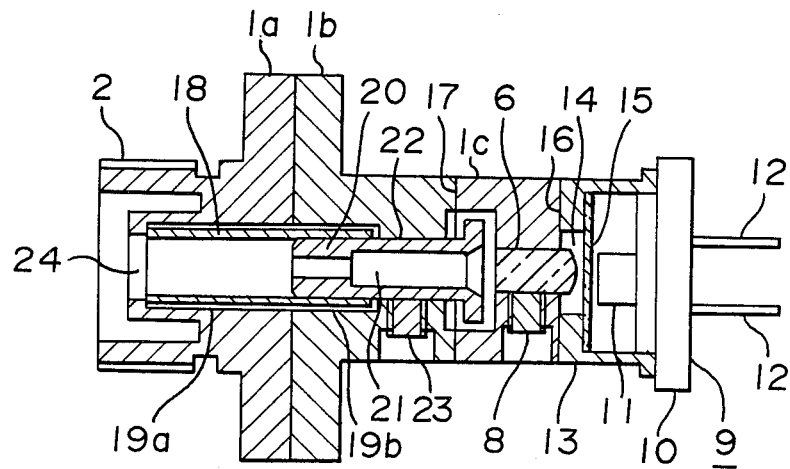
FIG. 1 is a cross-sectional view showing an embodiment of the present invention.
Figure 4:
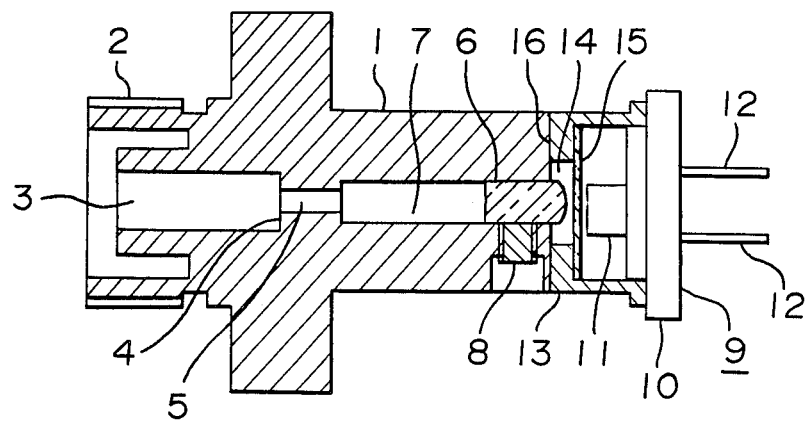
FIG. 4 is a cross-sectional view showing a conventional optical semiconductor module.
Figure 5:
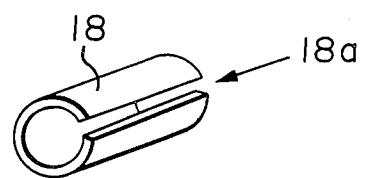
FIG. 5 is a perspective view of a slitted sleeve used for the present invention.

FIG. 1 shows a first embodiment of the present invention in which reference numerals 2, 6 and 8 to 16 designate the same and corresponding parts as in FIG. 4, and therefore, description of these parts is omitted.

The housing 1 is separated into three pieces, i.e. a first portion 1a, a second portion 1b and a third portion 1c. The first portion 1a and the second portion 1b are splitted at the intermediate portion of a flange formed in the outer periphery of the housing 1 which extends in the radial direction, and they are connected by means of, for instance, bolts. The second portion 1b and the third portion 1c are separated at a position of the housing body at the side of the lens 6 so that they are in contact with each other at a joint surface 17. A cylindrical hollow portions 19a, 19b are respectively formed in the first and second portions 1a, 1b on their axial lines in communicatively alignment with a hole 24 which is to receive the ferrule. The inner diameter of the hole 24 is smaller than the hole portions 19a, 19b formed in the first and second portions 1a, 1b and is greater than the outer diameter of the ferrule. A slitted sleeve 18 is received in the hollow portions 19a, 19b. The slitted sleeve 18 is made of a flexible material such as a steel pipe or a steel sheet. It has a generally hollow cylindrical body in which a slit 18a is formed in the cylindrical body along its axial line. The inner diameter of the slitted sleeve is slightly smaller than the outer diameter of the ferrule. A through hole 22 is formed in the second portion 1b so as to be in communicatively alignment with the through hole 24 and the holes 19a, 19b. The inner diameter of the hole 22 is slightly smaller than that of the hole portions 19a, 19b. The third portion 1c has a circular recess having a greater diameter than the inner diameter of the through hole 22 at the joint surface 17 and a through hole in which the lens 6 is fitted, the through hole being communicated with the recess.

A dummy ferrule 20 has an outer diameter which is the same as the outer diameter of the ferrule and a light transmitting hole 21 formed in the axial direction. One end of the dummy ferrule 20 is inserted in the slitted sleeve 18 so as to be in contact with the end surface of the ferrule when it is inserted in the slitted sleeve through the hole 24, and the other end of the dummy ferrule 20, which is enlarged in a flange form, is extended into the recess of the third portion 1c. The dummy ferrule 20 is secured in the through hole 22 by means of a screw 23 inserted from the outer periphery of the second portion 1b in the radial direction.

In the embodiment of the present invention, the ferrule inserted in the hole 24 by the spring action of a spring provided in the FC type connector undergoes determination in position by the end surface of the dummy ferrule 20. Further, the ferrule can be held in the same axial line as that of the dummy ferrule 20 by the spring action of the slitted sleeve, whereby the movement of the ferrule in the hole 24 is prevented and a stable optical connection can be obtained.

Figure 2:
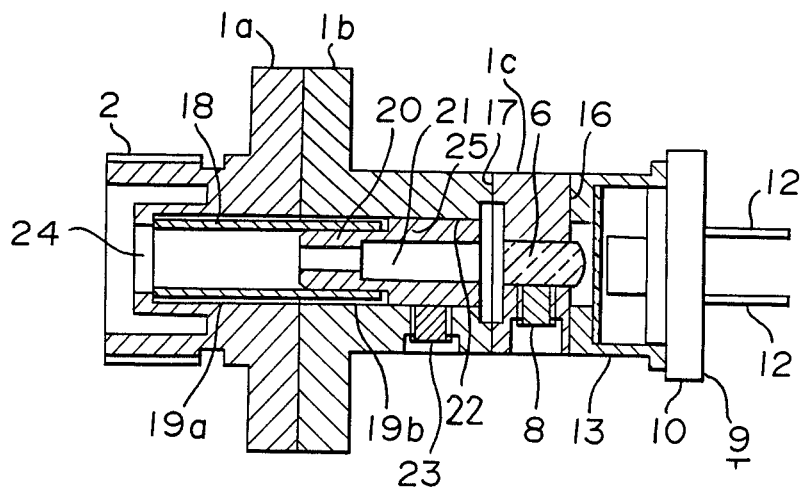
FIG. 2 is a cross-sectional view showing a second embodiment of the present invention.

FIG. 2 is a modified embodiment of the optical semiconductor module shown in FIG. 1. In FIG. 2, the same reference numerals designate the same or corresponding parts, and therefore, description of these parts is omitted.

In this embodiment, the through hole 22 formed in the second portion 1b of the housing has the same diameter as the hole 19b.

One end of the dummy ferrule 20 with the light transmitting hole 21 is inserted in the slitted sleeve 18, and the other end having a large diameter portion 25 which is fitted in the through hole 22 terminates before the joint surface 17 between the second and third portions 1b, 1c.

The lens 6 is fitted in the hole formed in the third portion 1c. The position of the lens in the axial direction is so determined that the focal point of the lens is at the end surface of an optical fiber or fibers held in the ferrule, and then, the lens 6 is fixed by fastening the screw 8. The optical semiconductor assembly 9 is joined to the third portion 1c of the housing at the joint surface 16. The third portion 1c is joined to the second portion 1c at the joint surface 17 after determining of the position of the third portion 1c in the direction perpendicular to the axial direciton so that the largest quantity of light elimited from the optical semiconductor assembly 9 is connected to the optical fiber or fibers in the ferrule.

In the second embodiment, the same function and effect can be obtained as those in the first embodiment shown in FIG. 1.

The third embodiment of the optical semiconductor module of the present invention will be described with reference to FIG. 3.

Figure 3:
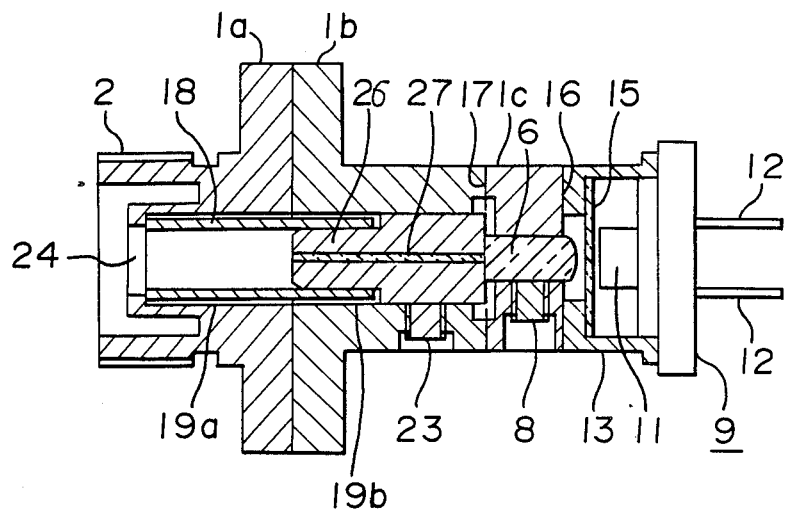
FIG. 3 is a cross-sectional view showing a third embodiment of the present invention.

In FIG. 3, the same reference numerals as in FIGS. 1 and 2 designate the same or corresponding parts, and therefore, description of these parts is omitted.

A dummy ferrule 26 has a central bore extending in its axial direction in which an optical fiber or fibers 27 are fitted. One end of the dummy ferrule 26 has one end, which outer diameter is the same as the outer diameter of the ferrule, inserted in the slitted sleeve 18 so as to be in contact with the end surface of the ferrule when it is inserted in the hole 24 formed in the first portion 1a of the housing. The other end of the dummy ferrule 26, the outer diameter of which is slightly smaller than the inner diameter of the through hole 22, terminates at the joint surface 17 between the second and third portions 1b, 1c. The dummy ferrule 26 is fixed in the through hole 22 by means of the screw 23.

The lens 6 is held in the hole of the third portion 1c so that an end of the lens 6 is in contact with the end of the dummy ferrule 26 so that the focal point of the lens 6 is at the end surface of the optical fiber or fibers 27 in the dummy ferrule 26, the end surface of the optical fiber 27 being in contact with the lens 6.

In the third embodiment of the present invention, deviation of an optical axis, which may be caused by the deviation of an angle when the third portion 1c with the lens is joined to the second portion 1b, can be eliminated, and a stable optical connection can be obtained. In the third embodiment, the same function and effect as the first and second embodiments can be obtained.

In the following, explanation will be made how the optical semiconductor module is assembled.

The dummy ferrule 20 is inserted in the second portion 1b in such a manner that the left end (in FIGS. 1, 2 and 3) of the dummy ferrule 20 is determined at a position at which the free end of the ferrule of a connector comes in contact with the left end of the dummy ferrule 20, and the screw 23 is screwed to fix the dummy ferrule 20.

The slitted sleeve 18 is radially expanded and fitted to the outer periphery of the dummy ferrule 20 by utilizing the spring action which tends to contract toward the axial center.

The first portion 1a is connected to the second portion 1b by means of bolts.

The lens 6 is inserted in the hole of the third portion 1c.

The third portion 1c and the optical semiconductor assembly 9 are fitted to the second portion 1c at joint surfaces 16 and 17 so as to be in alignment with each other so that light from the optical semiconductor assembly 9 is focused by the lens 6 and the focused light can be coupled to the maximum extent with the optical fiber in the ferrule of the connector when the connector is fitted to the inner bore of the slitted sleeve 18.

Then, the second portion 1b, the third portion 1c and the optical semiconductor assembly 9 are joined all together by bolts, and the lens 6 by the screw 8.

I claim:

1. An optical semiconductor module comprising an optical semiconductor assembly having a light transmitting aperture, a housing having a joint surface at its one end to be joined to said optical semiconductor assembly, an outer male screw portion and a first hole means for receiving an optical fiber supporter at its other end, a lens held in a second hole means formed in said housing so as to be in communicative alignment with said light transmitting aperture and said first hole means, characterized by comprising a slitted sleeve placed in a hole communicated with said first hole means and a dummy ferrule placed in said communicated hole of said housing, with an axially extending central bore for passing light, which is placed between said first hole means and said lens so that one end portion of said dummy ferrule is inserted in said slitted sleeve so as to be in contact with said optical fiber supporter when it is fitted.

2. The optical semiconductor module according to claim 1, wherein said housing is provided with an outer flange, and is separated into three pieces in the radial direction at an intermediate position of said flange and at a position in the body at the side of said lens.

3. The optical semiconductor module according to claim 2, wherein said first hole means has an inner diameter which is greater than the outer diameter of said optical fiber supporter and smaller than the outer diameter of said slitted sleeve.

4. The optical semiconductor module according to claim 1, wherein said dummy ferrule holds at least one optical fiber in the central bore.

5. The optical semiconductor module according to claim 4, wherein said lens is supported by the third portion of said housing, and said dummy ferrule is supported by the second portion, and said lens and said dummy ferrule are in contact with each other.

* * * * *